(12) United States Patent
Chen

(10) Patent No.: US 8,489,642 B2
(45) Date of Patent: Jul. 16, 2013

(54) ITEM SWITCHING METHOD, MAN-MACHINE INTERFACE AND CORDLESS PHONE HANDSET

(75) Inventor: Wo-Chin Chen, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 421 days.

(21) Appl. No.: 12/908,889

(22) Filed: Oct. 21, 2010

(65) Prior Publication Data

US 2012/0042285 A1 Feb. 16, 2012

(30) Foreign Application Priority Data

Aug. 16, 2010 (TW) .............................. 099127272 A

(51) Int. Cl.
*G06F 7/00* (2006.01)
(52) U.S. Cl.
USPC .......................................... 707/793; 707/803
(58) Field of Classification Search
CPC .......... G06F 17/30286; G06F 17/30595; G06Q 10/10
USPC ................... 707/793, 999.101, 803
See application file for complete search history.

(56) References Cited

U.S. PATENT DOCUMENTS

| | | | | |
|---|---|---|---|---|
| 5,586,255 A * | 12/1996 | Tanaka et al. | ................. | 709/223 |
| 5,760,776 A * | 6/1998 | McGurrin et al. | ............ | 715/841 |
| 5,895,459 A * | 4/1999 | Enomoto | ........................ | 706/10 |
| 5,930,787 A * | 7/1999 | Minakuchi et al. | .................... | 1/1 |
| 5,977,890 A * | 11/1999 | Rigoutsos et al. | .............. | 341/55 |
| 6,049,812 A * | 4/2000 | Bertram et al. | ............... | 715/205 |
| 6,184,880 B1 * | 2/2001 | Okada | ........................... | 715/704 |
| 6,448,986 B1 * | 9/2002 | Smith | ........................... | 715/801 |
| 6,453,111 B1 * | 9/2002 | Sklar et al. | .................... | 386/281 |
| 6,594,650 B2 * | 7/2003 | Hasuo et al. | .......................... | 1/1 |
| 7,165,078 B2 * | 1/2007 | Lang et al. | ............................. | 1/1 |
| 7,363,307 B1 * | 4/2008 | Yamagishi et al. | ................... | 1/1 |
| 7,650,574 B2 * | 1/2010 | Nattinger | ....................... | 715/763 |
| 7,962,385 B2 * | 6/2011 | Falk et al. | ....................... | 705/35 |
| 2002/0010718 A1 * | 1/2002 | Miller | ........................... | 707/526 |
| 2003/0126352 A1 * | 7/2003 | Barrett | ........................ | 711/100 |
| 2003/0176197 A1 * | 9/2003 | Chen et al. | ..................... | 455/462 |
| 2004/0139070 A1 * | 7/2004 | Dysart et al. | ..................... | 707/3 |
| 2004/0215566 A1 * | 10/2004 | Meurer | ...................... | 705/43 |
| 2005/0010454 A1 * | 1/2005 | Falk et al. | ......................... | 705/4 |
| 2005/0165713 A1 * | 7/2005 | Lafforet | ........................... | 707/1 |
| 2005/0210399 A1 * | 9/2005 | Filner et al. | .................... | 715/767 |
| 2005/0257203 A1 * | 11/2005 | Nattinger | ...................... | 717/154 |
| 2005/0268173 A1 * | 12/2005 | Kudukoli et al. | .............. | 714/38 |
| 2006/0072738 A1 * | 4/2006 | Louis et al. | ............. | 379/265.02 |
| 2007/0072249 A1 * | 3/2007 | Baum et al. | ........................ | 435/7.2 |
| 2007/0123251 A1 * | 5/2007 | McElvaney | ................ | 455/426.1 |
| 2007/0229650 A1 * | 10/2007 | McKay | ...................... | 348/14.01 |
| 2008/0015885 A1 * | 1/2008 | Bennett et al. | .................... | 705/1 |
| 2008/0200142 A1 * | 8/2008 | Abdel-Kader et al. | ..... | 455/404.2 |
| 2008/0207137 A1 * | 8/2008 | Maharajh et al. | ............... | 455/74 |
| 2008/0243645 A1 * | 10/2008 | Bayer et al. | ..................... | 705/27 |
| 2008/0244465 A1 * | 10/2008 | Kongqiao et al. | ............ | 715/863 |
| 2009/0070349 A1 * | 3/2009 | Hiscock et al. | ............... | 707/100 |

(Continued)

*Primary Examiner* — Phuong Thao Cao

(74) *Attorney, Agent, or Firm* — Winston Hsu; Scott Margo

(57) ABSTRACT

An item switching method for a man-machine interface having a plurality of objects includes generating a stack list for recording selecting information related to the plurality of objects, receiving a command for selecting an object from the plurality of objects, and determining a procedure to select the object according to the command and the selecting information recorded in the stack list.

10 Claims, 5 Drawing Sheets

U.S. PATENT DOCUMENTS

| | | | |
|---|---|---|---|
| 2009/0106208 A1* | 4/2009 | Matellanes et al. | 707/3 |
| 2009/0170457 A1* | 7/2009 | Videtich | 455/185.1 |
| 2010/0062766 A1* | 3/2010 | Cook | 455/435.1 |
| 2010/0122162 A1* | 5/2010 | Terada et al. | 715/702 |
| 2010/0197326 A1* | 8/2010 | Ngo | 455/466 |
| 2011/0059722 A1* | 3/2011 | Abdel-Kader et al. | 455/404.2 |
| 2012/0016900 A1* | 1/2012 | Slinker et al. | 707/769 |
| 2012/0036456 A1* | 2/2012 | Grunberger | 715/760 |

* cited by examiner

ITEM SWITCHING METHOD, MAN-MACHINE INTERFACE AND CORDLESS PHONE HANDSET

BACKGROUND OF THE INVENTION

1. Field of the Invention

The present invention relates to an item switching method, man-machine interface and sub-handset, and more particularly, to an item switching method, man-machine interface and sub-handset capable of saving required memory space.

2. Description of the Prior Art

A cordless phone is a small coverage telephone system commonly used in daily life and generally composed of a master phone and a portable sub-handset. Since the master phone and the sub-handset exchange signals via air interface, in order to avoid interferences toward other electronic devices or communication products, the prior arts have established related cordless phone communication standards to define operational frequency bands, power, coding, modulations, etc. Digital enhanced cordless telecommunications (DECT) is a widely used cordless phone communication standard, which provides a pico-cell method to achieve clear voice quality without interference.

In addition, in order to increase convenience, DECT-related manufacturers attempt to develop DECT sub-handsets with more functionalities and lower cost, in order to increase product competitivity. However, to satisfy the low cost requires reducing memory implementation, for example, to configure dynamic random access memory to 64K and read-only memory to 512K. In such a situation, with all function equipped, man-machine interface (MMI) development becomes more difficult. The prior arts usually adopt object-oriented programming languages or C language to develop a man-machine interface of a DECT phone, which costs memory to save selection/switching information, and cannot be applied for applications with memory usage limitation. It is necessary to develop a framework or method which reduces memory usage.

SUMMARY OF THE INVENTION

It is therefore a primary objective of the present invention to provide item switching method, man-machine interface and sub-handset.

The present invention discloses an item switching method for a man-machine interface having a plurality of objects, which comprises steps of generating a stack list utilized for recording selecting information related to the plurality of objects; receiving a command utilized for selecting an object from the plurality of objects; and determining a procedure utilized for selecting the object according to the command and the selecting information recorded in the stack list.

The present invention discloses a cordless phone sub-handset, which comprises a central processing unit, for executing a man-machine interface; and a storage device, coupled to the central processing unit, for storing the man-machine interface. The man-machine interface comprises a plurality of objects; and a switching module, which comprises a generating module, for generating a stack list utilized for recording selecting information related to the plurality of objects; a receiving module, for receiving a command utilized for selecting an object from the plurality of objects; and a determining module, for determining a procedure utilized for selecting the object according to the command and the selecting information recorded in the stack list.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
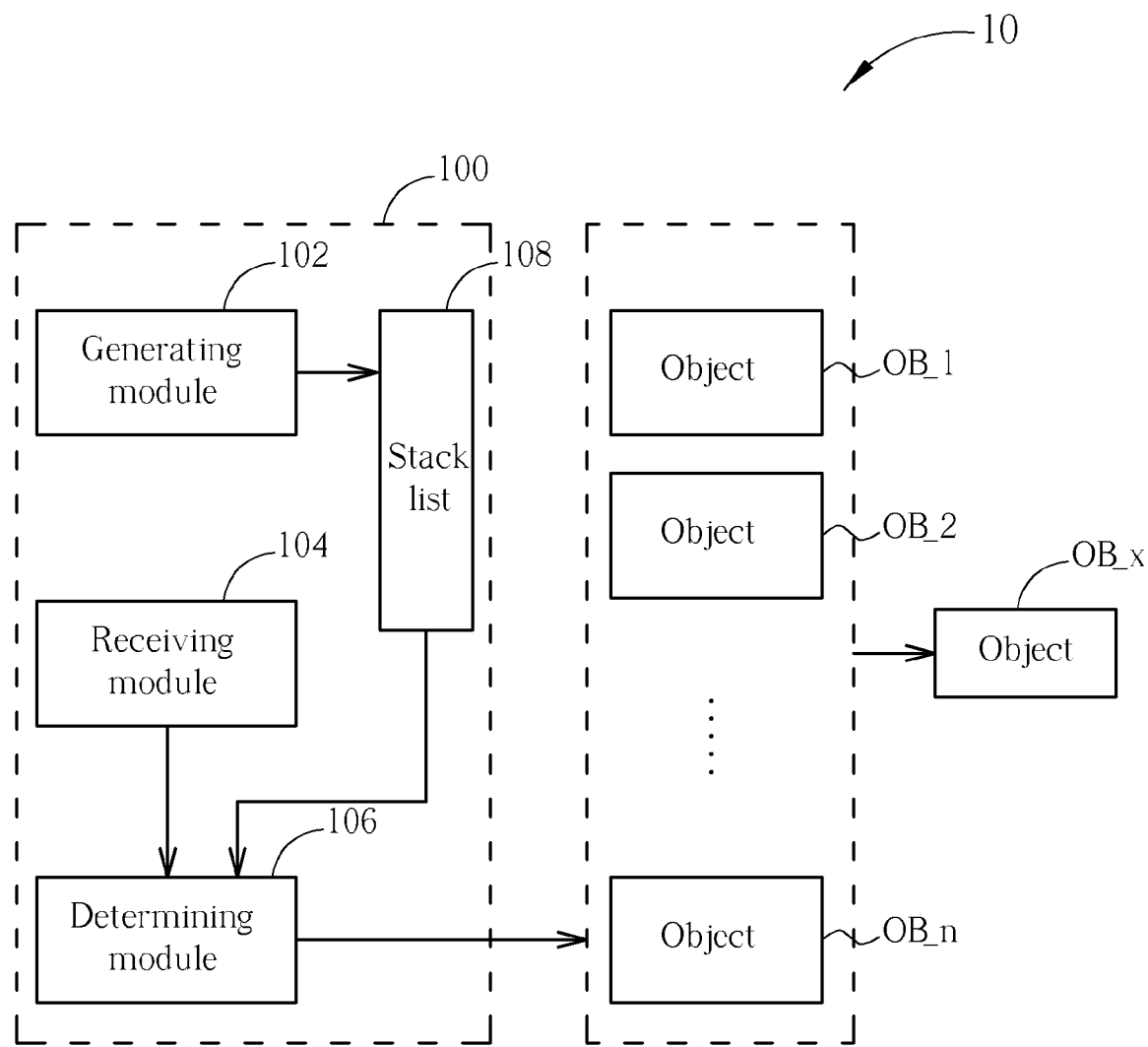
FIG. 1 illustrates a schematic diagram of a man-machine interface according to an embodiment of the present invention.

Please refer to FIG. 1, which illustrates a schematic diagram of a man-machine interface 10 according to an embodiment of the present invention. The man-machine interface 10 is preferably utilized for a cordless phone sub-handset, such as a DECT sub-handset. The man-machine interface 10 includes objects OB_1-OB_n and a switching module 100. The objects OB_1-OB_n can be corresponding to a menu tree. Each of the objects OB_1-OB_n is corresponding to a function of the cordless phone sub-handset, and makes the cordless phone sub-handset operate in a specified state. The switching module 100 is utilized to select an object OB_x from the object OB_1-OB_n according to a user request. The switching module 100 includes a generating module 102, a receiving module 104 and a determining module 106. The generating module 102 is utilized for generating a stack list 108, to record selecting information related to the objects OB_1-OB_n. The receiving module 104 is utilized for receiving a user command, to select the object OB_x. The determining module 106 is utilized for determining a procedure for selecting the object OB_x according to the user command received by the receiving module 104 and the selecting information recorded stack list 108.

In short, the present invention uses the stack list 108 to record the selecting information of the objects OB_1-OB_n, as references for switching the objects. The stack list 108 is preferably stored in a fixed area of memory. In other words, the present invention uses the memory space repeatedly, in order to switch the objects. In such a situation, the memory space can be conserved efficiently.

In detail, when the selecting information recorded in the stack list 108 includes a selecting record of the object OB_x, the determining module 106 uses the selecting record to select the object OB_x, i.e. returns to the node corresponding to the state of the object OB_x in the menu tree, and restores to the selection. On the contrary, when the selecting information recorded in the stack list 108 does not include the selecting record of the object OB_x, the determining module 106 uses a default selecting procedure to select, meaning the node corresponding to the state of the object OB_x is a new leaf in the menu tree or is deleted from the menu tree, hence to use the default selecting procedure. In addition, after selecting the object OB_x, if the stack list 108 includes a selecting record which is corresponding to another object, and an execution level of another object is lower than the execution level of the object OB_x, the determining module 106 can further delete the selecting record of the another object. Namely, the selecting record corresponding to the lower execution level in the stack list 108 will be deleted, in order to conserve the memory space.

Figure 2A:
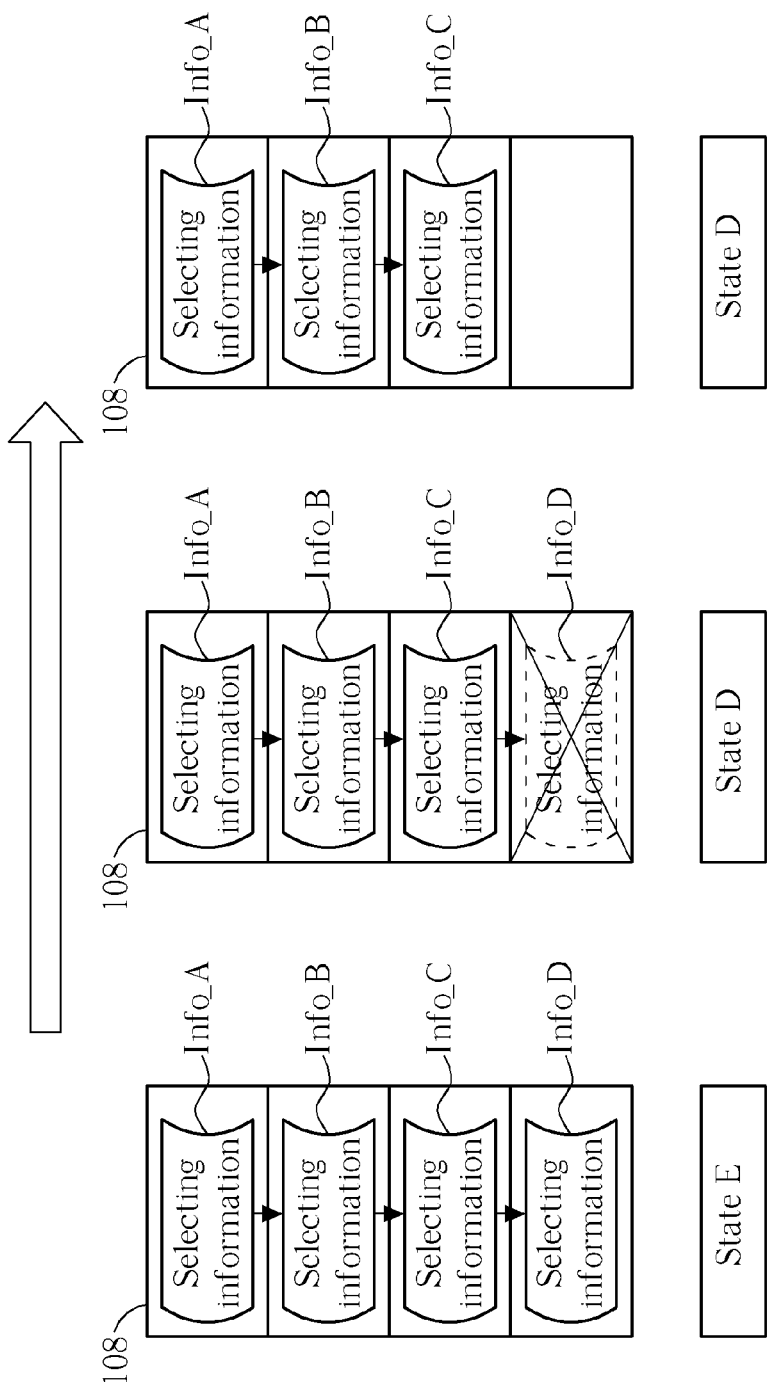
FIG. 2A to 2C illustrates storing states of a stack list shown in FIG. 1 respectively.
Figure 2B:
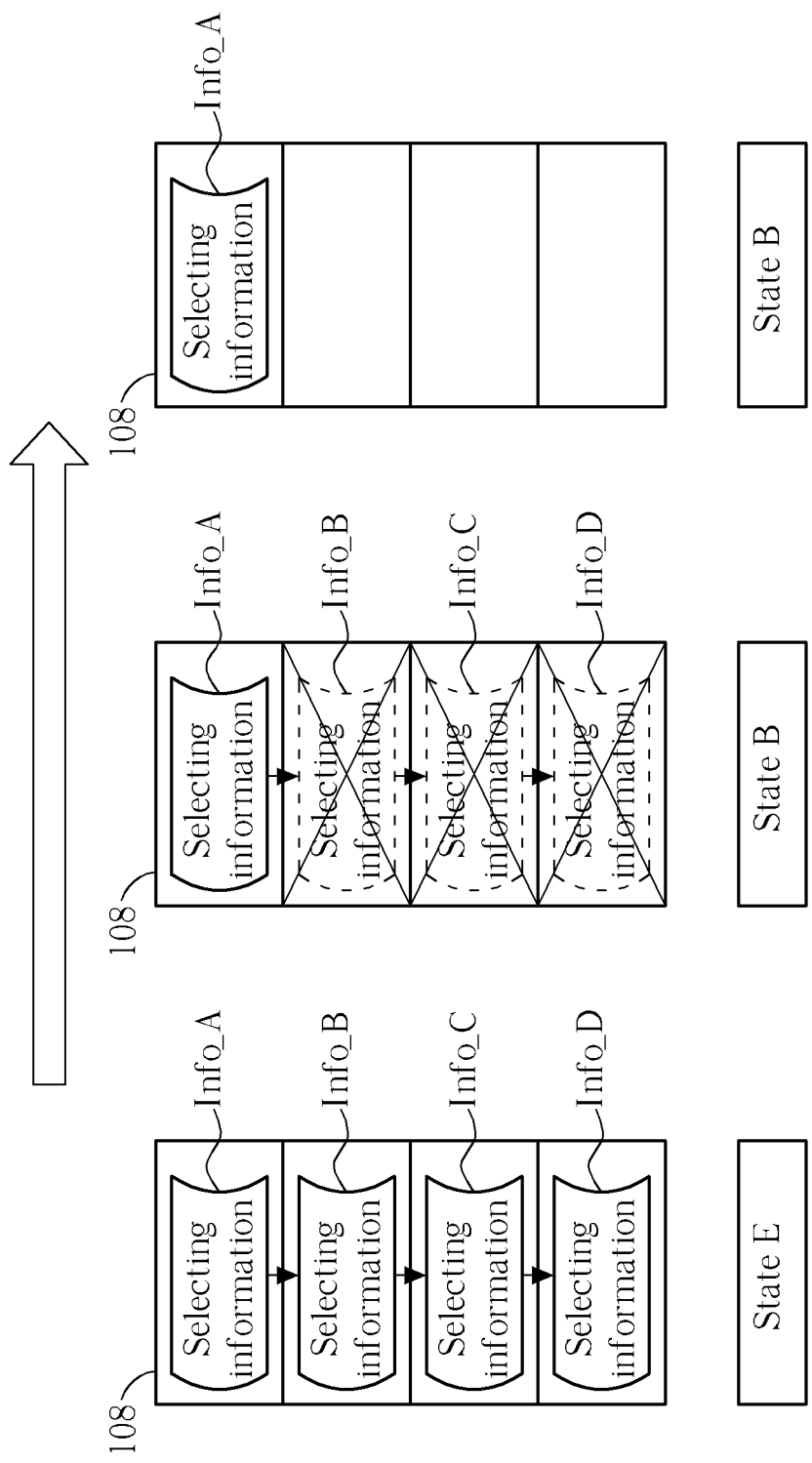
Figure 2C:
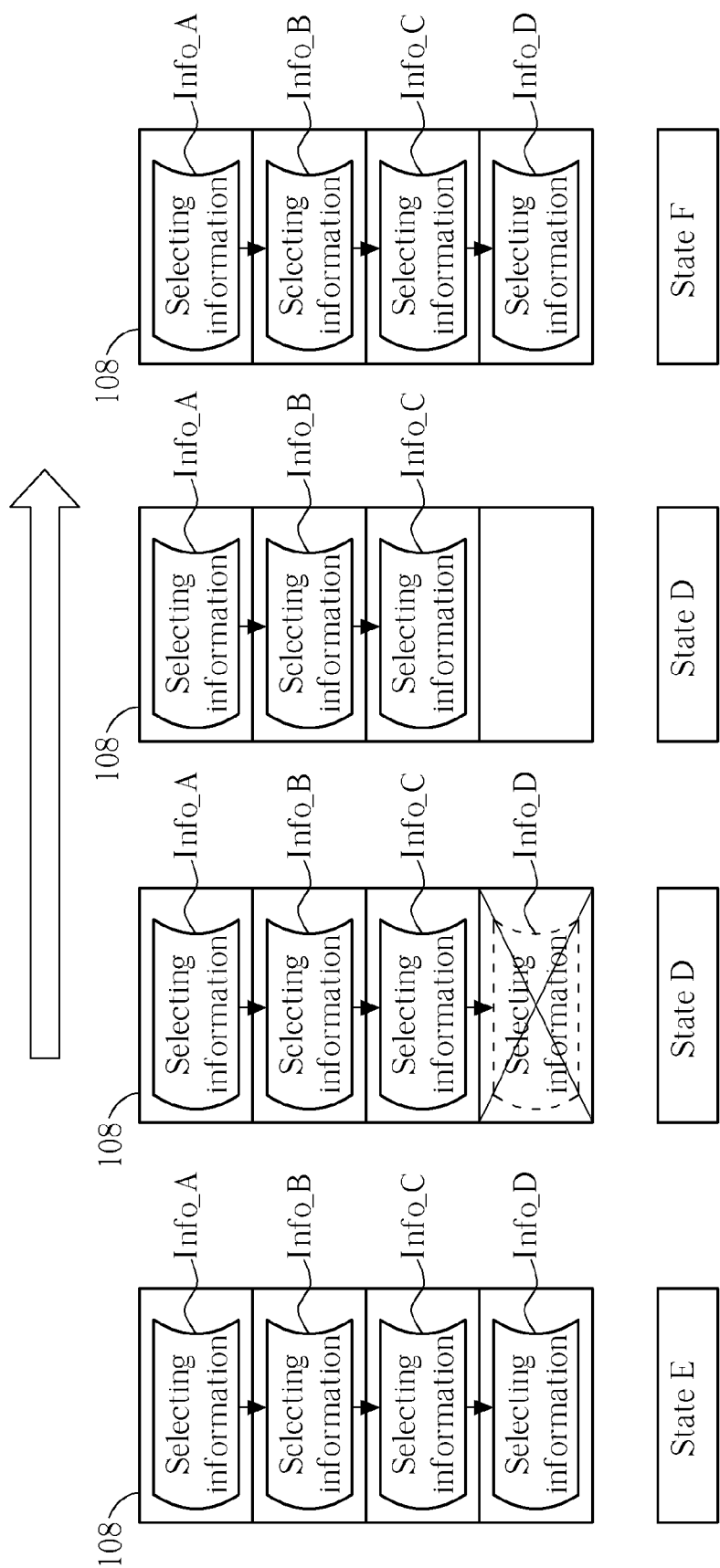

For example, please refer to FIG. 2A to FIG. 2C, representing storing states of the stack list 108 respectively. In FIG. 2A to FIG. 2C, the selecting information Info_A-Info_E are corresponding to the top five execution level objects OB_A-OB_E in the objects OB_1-OB_n respectively, and the corresponding states of the objects OB_A-OB_E are named after states A-E respectively. Additionally, there is another object OB_F, which has a lower execution level than the object OB_D but the same execution level as the object OB_E.

As shown in FIG. 2A, a user orderly selects the object OB_A to the object OB_E, and the operation state is therefore in state E. If the user indicates to return back to state D, since the selecting information Info_D of the object OB_D has been recorded in the stack list 108, the determining module 106 retrieves the selecting information Info_D of the object OB_D and restores to the state D. Meanwhile, after restoring to the state D, the selecting information Info_D stored in the stack list 108 will be deleted, and only the selecting information Info_A to the selecting information Info_C are left.

As shown in FIG. 2B, the user orderly selects the object OB_A to the object OB_E, and the operation state is therefore in state E. If the user indicates to return back to the state B, since the selecting information Info_B of the object OB_B has been recorded in the stack list 108, the determining module 106 retrieves the selecting information Info_B of the object OB_B and restores to the state B. Meanwhile, after restoring to the state B, the selecting information Info_B, Info_C, and Info_D stored in the stack list 108 will be deleted, and only the selecting information Info_A is left. Moreover, in the state B, when leaving from the state B to the state D, since the stack list 108 has no selecting information Info_D of the state D, one can either set the state D as a leaf node of the state B to switch the state D back to the state B, or suggest the state A in the selecting information Info_D of the state D to directly lead to the state A under the normal operations instead of switching back to the state B.

As shown in FIG. 2C, the user orderly selects from the object OB_A to the object OB_E, and the operation state is therefore in state E. If the user indicates to return back to the state D and then enter the state F, since the selecting information Info_D of the object OB_D has been recorded in the stack list 108, the determining module 106 retrieves the selecting information Info_D of the object OB_D, restores to the state D, and deletes the selecting information Info_D stored in the stack list 108. Next, when entering the state F, the determining module 106 records the selecting information Info_D in the stack list 108.

Note that, FIG. 2A to FIG. 2C are to describe the concept of the present invention, and those skilled in the art can make modification therewith. In addition, when implementing the man-machine interface 10, it can be stored in a storage device of the cordless phone sub-handset, such as the memory, and executed from a central processing unit, and such implementations should be ordinary skills in the art.

Figure 3:
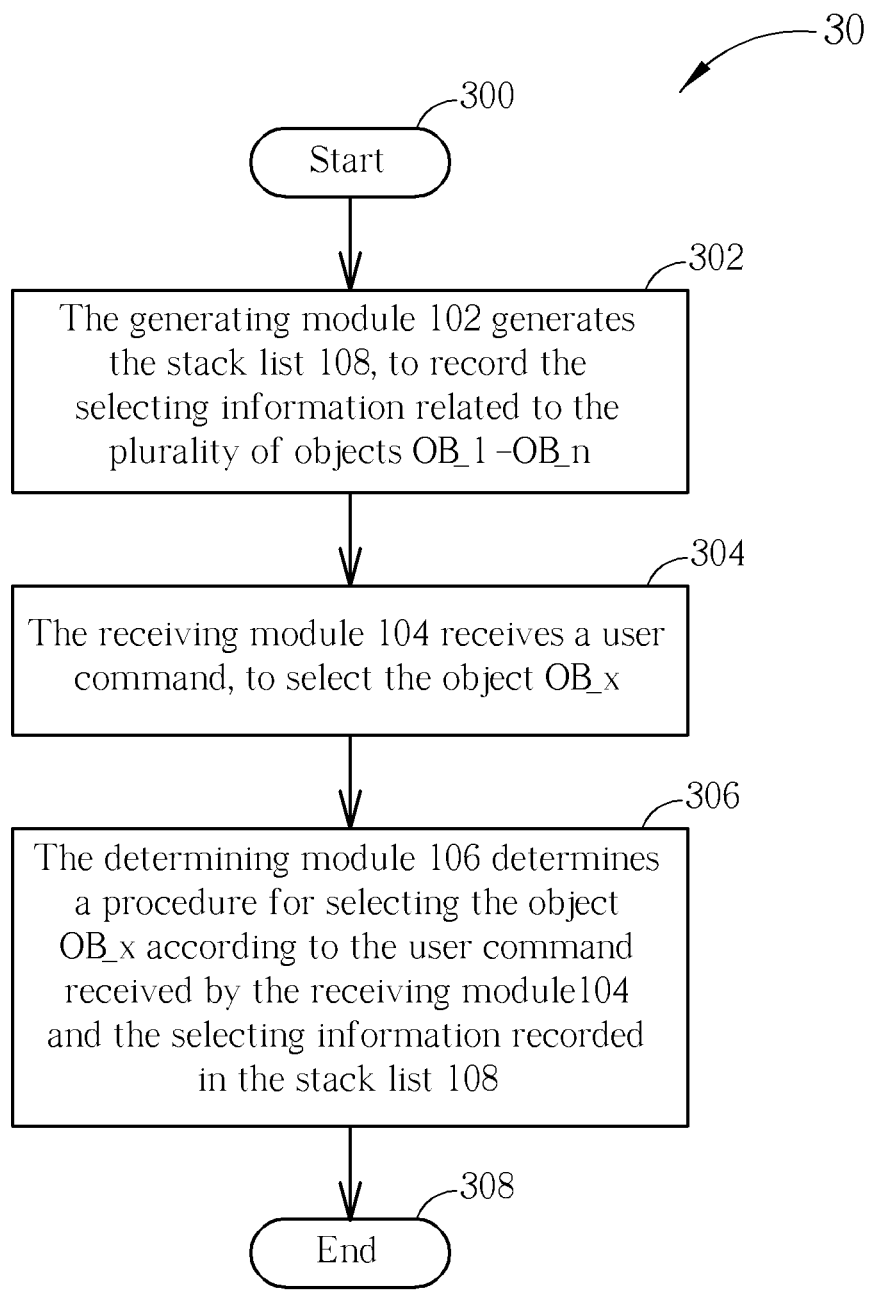
FIG. 3 illustrates a schematic diagram of a switch process according to an embodiment of the present invention.

The above mentioned operations relate to the switching module 100, and can be further concluded as a switching process 30 shown in FIG. 3. The switching process 30 includes the following steps:

Step 300: Start.

Step 302: The generating module 102 generates the stack list 108, to record the selecting information related to the plurality of objects OB_1-OB_n.

Step 304: The receiving module 104 receives a user command, to select the object OB_x.

Step 306: The determining module 106 determines a procedure for selecting the object OB_x according to the user command received by the receiving module 104 and the selecting information recorded in the stack list 108.

Step 308: End.

Detailed description of the switching process 30 can be referred to the above, and is not narrated hereinafter for simplicity.

In the prior art, the man-machine interface of DECT sub-handset usually developed with object-oriented language or C language, and thus requires a lot of memory to store the selecting information, and is not applicable for applications with memory limitation. In comparison, the present invention uses the fixed areas in the memory to store a stack list for the selecting information of recording the objects, which conserves required memory space efficiently. In such a situation, the present invention can implement multi-functional man-machine interface.

To sum up, the present invention uses the fixed memory space to record the selecting information of the objects, which conserves required memory space efficiently, so as to implement multi-functional man-machine interface.

Those skilled in the art will readily observe that numerous modifications and alterations of the device and method may be made while retaining the teachings of the invention.

What is claimed is:

1. An item switching method for a man-machine interface having a plurality of objects, the method comprising:
   generating a stack list utilized for recording selecting information related to the plurality of objects, wherein the stack list comprises a first selecting record corresponding to a first object after selecting an object, and a first execution level of the first object is lower than an execution level of the object;
   receiving a command utilized for selecting the object from the plurality of objects;
   determining a procedure utilized for selecting the object according to the command and the selecting information recorded in the stack list; and
   utilizing a central processing unit to delete the first selecting record in the stack list.

2. The item switching method of claim 1, wherein the step of determining the procedure utilized for selecting the object according to the command and the selecting information recorded in the stack list comprises:
   using a selecting record of the object to select the object when the selecting information recorded in the stack list comprises the selecting record.

3. The item switching method of claim 1, wherein the step of determining the procedure utilized for selecting the object according to the command and the selecting information recorded in the stack list comprises:
   using a default selecting procedure to select the object when the selecting information recorded in the stack list does not comprise a selecting record of the object.

4. A man-machine interface comprising:
   a plurality of objects; and
   a central processing unit, arranged for executing a switching module, the switching module comprising:
   a generating module, configured to generate a stack list utilized for recording selecting information related to the plurality of objects, wherein the stack list comprises a first selecting record corresponding to a first object after selecting an object, and a first execution level of the first object is lower than an execution level of the object;
   a receiving module, configured to receive a command utilized for selecting the object from the plurality of objects; and a determining module, configured to determine a procedure utilized for selecting the object according to the command and the selecting information recorded in the stack list, and deleting the first selecting record in the stack list.

5. The man-machine interface of claim 4, wherein the determining module is utilized for using a selecting record of the object to select the object when the selecting information recorded in the stack list comprises the selecting record.

6. The man-machine interface of claim 4, wherein the determining module is utilized for using a default selecting procedure to select the object when the selecting information recorded in the stack list does not comprise a selecting record of the object.

7. A cordless phone sub-handset comprising:
   a central processing unit, for executing a man-machine interface; and
   a storage device, coupled to the central processing unit, configured to store the man-machine interface, wherein the man-machine interface comprises:
      a plurality of objects; and
      a switching module, comprising:
         a generating module, configured to generate a stack list utilized for recording selecting information related to the plurality of objects, wherein the stack list comprises a first selecting record corresponding to a first object after selecting an object, and a first execution level of the first object is lower than an execution level of the object;
         a receiving module, configured to receive a command utilized for selecting the object from the plurality of objects; and
         a determining module, configured to determine a procedure utilized for selecting the object according to the command and the selecting information recorded in the stack list, and deleting the first selecting record in the stack list.

8. The cordless phone sub-handset of claim 7, wherein the determining module is utilized for using a selecting record of the object to select the object when the selecting information recorded in the stack list comprises the selecting record.

9. The cordless phone sub-handset of claim 7, wherein the determining module is utilized for using a default selecting procedure to select the object when the selecting information recorded in the stack list does not comprise a selecting record of the object.

10. The cordless phone sub-handset of claim 7 conforming to a Digital Enhanced Cordless Telecommunications standard.

* * * * *